United States Patent Office 2,973,268
Patented Feb. 28, 1961

2,973,268

METHOD OF MAKING POTATO CHIPS

Chester M. Gooding, Westfield, and Daniel Melnick, Teaneck, N.J., assignors to Corn Products Company, a corporation of Delaware No Drawing. Filed Aug. 22, 1958, Ser. No. 756,543

10 Claims. (Cl. 99—100)

This invention relates to a novel continuous method of frying potato chips which includes a process of preventing polymer formation in the frying oil. This application is a continuation-in-part of our copending application Serial No. 496,592, filed March 24, 1955, which issued as Patent No. 2,874,055 dated February 17, 1959, and which said patent was on March 8, 1960 reissued as Patent No. Re. 24,791.

Presently in the potato chip industry several methods are used for the manufacture of potato chips. The methods of preparation differ primarily in the type of oleaginous material which is employed. The oleaginous materials which are employed comprise the limpid unhydrogenated oils, shortening and blends of shortening and limpid unhydrogenated oil. The limpid oil imparts good flavor to the potato chip by permitting the true potato flavor to be readily noted but the limpid oil lacks stability which causes the potato chip to have a relatively short shelf life. Shortening, on the other hand, and chips fried in it have extraordinarily long shelf lives but the chips lack the full potato flavor characteristic of those prepared with limpid unhydrogenated oils. The blends of shortening and limpid oil improve the shelf life of the fried product to only a very slight degree, but unfortunately, when this slight improvement is obtained, the amount of shortening required tends to mask the influence of the limpid oil as regards flavor.

Usually, frying of any foodstuff brings about a change in the character of the frying oil. Depending on the oleaginous material and the conditions of frying, varying amounts of conjugated dienoic acids and polymers are formed with attendant reduction in iodine number and linoleic acid content. Polymers are not desirable because they are either poorly absorbed from the digestive tract or they may be toxic. The reduction in iodine number accompanies the formation of polymers, thus serving as a quick indication that polymerization may have taken place. The formation of polymers follows the development of fatty acids having conjugated double bonds. The conjugated dienoic acids are the known precursors of the polymers. The conjugated dienoic acids may polymerize with, for example, natural linoleic acid in the oil and result in high molecular weight polymeric products having the undesirable characteristics mentioned above.

In addition, there also occurs in fryings an increase in the concentration of free fatty acids. These may crystallize on the chip and thereby impart a bad appearance to the fried product, and more usually, a bad flavor.

As one might expect, the tendency of an oil to polymerize may be predicted from the quantity of conjugated dienoic acids it contains. Any oil having a measurable quantity of such dienoic acids is said to be highly polymerizable under frying conditions, and it would be expected that such an oil is unsuited for frying purposes. The novel frying oil of our Patent No. 2,874,055, issued February 17, 1959, possesses a rather high amount of conjugated dienoic acids pointing to its apparent unsuitability as a frying oil. We have now discovered that this heretofore accepted premise does not apply in the use of the novel oils described in our co-pending application when these oils are used to fry potato slices according to the process of the present invention. In contrast to our novel oils, limpid unhydrogenated oils are usually substantially free of the conjugated dienoic acids and this can also be said for shortenings.

The manufacture of potato chips constitutes an important use of frying oils. Based on past experience, it may be said that oils known to be useful for frying purposes generally are also useful for the manufacture of potato chips. This generalization has been true in the matter of polymer formation, that is, an oil having the tendency to produce polymers for the preparation of other food products, would likewise be expected to produce polymers in the manufacture of potato chips. The same may be said for reduction in iodine number and free fatty acid formation.

Therefore, it is the object of this invention to provide a continuous method of manufacturing potato chips by which the undesirable formation of polymers and free fatty acids may be substantially avoided while providing a potato chip having exceptionally good flavor, eating quality and stability.

Other objects and advantages of this invention will become apparent from the following description and explanation thereof.

The potato chip of this invention is prepared by continuously frying raw potato segments in a selectively hydrogenated deodorized, frying oil, the vegetable oil having an iodine value of about 75 to 94, a melting point of about 80° to 95° F. and a setting point of about 55° to 65° F.

An important feature of the present invention is that the potato chip must be manufactured by a continuous method. A continuous method of operation is one in which the oil held at a frying temperature, e.g. 385° F., is always or substantially always in contact with the potato chips being fried. The continuous method lends itself to commercial application, but it may not be practical for small intermittent operations such as occur in restaurants or other comparable eating places. Upon interruption of a continuous operation, viz. at the end of full day's operation, the residual frying oil in the fryer is cooled as expeditiously as possible, commonly by adding it to the reservoir oil held at much lower temperatures. When the oil of the present invention is out of contact with the potato chip it is found that it deteriorates in a manner similar to the degradation which occurs when using the same oil for the manufacture of other fried foods.

The raw potato chip is a segment of potato having a thickness ranging from about 0.035 to about 0.065 inch. The kind of potato is not important as regards procuring the advantages of this invention.

In the manufacturing procedure the frying oil is maintained at a temperature of about 320° to about 400° F., preferably about 350° to about 390° F. It requires about 1.5 to about 6 minutes, preferably about 2 to about 4 minutes, for the potato chip to cook to the desired extent. The quantity of potato chips in contact with oil is expressed in terms of pounds of chips produced per hour per 1000 pounds of frying oil; it is in the range of 50 to 500 pounds of finished chips per 1000 pounds of oil. The quantity of potato in contact with the frying oil at frying temperatures, the frying temperature and the frying time may vary outside the ranges just given; however, the results are less satisfactory. The procedure for the preparation of potato chips is well understood to those skilled in the art, and so it will be readily appreciated by skilled persons how the conditions of operation can be varied within the scope of the present invention.

As previously indicated, the novel frying oil is one which has been selectively hydrogenated and deodorized, and characterized by an iodine value of about 75 to 94, a melting point of about 80° to 95° F. and a setting point of about 55° to 65° F. Depending on the source of the starting oil, the properties of the frying oil may vary for preferred results. In regard to unsaturated starting oils, that is, those having an iodine value of at least 120, the preferred properties of the finished frying oil include an iodine value of about 82 to 94, a melting point of about 82° to 92° F. and a setting point of about 55° to 65° F. Soybean and corn oils are illustrative of such unsaturated starting materials. In regard to the more saturated starting oils, that is, those having an iodine value of less than 120, the preferred properties of the hydrogenated product include an iodine value of 75 to 92, a melting point of about 85° to 95° F. and a setting point of 55° to 65° F. Cottonseed and peanut oils are exemplary of such more saturated starting oils.

The established methods of determining the setting (congealing) point of hydrogenated oils are not applicable to the new frying oils. In the present case, this value is determined by first pre-chilling the oil to 55.5° F. in a 32°–41° F. water bath and then transferring it to a 32°–41° F. air bath. The oil is then subjected to slow uniform agitation until the temperature of the oil ceases to fall or comes to rest. The maximal temperature resulting from the release of heat of crystallization is then recorded as the setting point. Likewise a procedure for determining setting point of the conventional limpid frying oils had to be developed in order to differentiate them from those of the present invention. The procedure calls for the pre-chilling of the limpid oils to 5° to —5° F. in an acetone-solid carbon dioxide bath with constant slow agitation until turbidity first develops. The tube containing the oil is then transferred to an air bath at 5° to —5° F. and the highest temperature is recorded as the setting point. In determining the melting points of these same limpid frying oils, a modified Wiley method was employed. The oil is cast as a solid disc on solid carbon dioxide. The disc is then added to a melting point tube containing a 50:50 glycerine-water solution as the bottom layer and isopropanol as the top layer. The temperature of the acetone-solid carbon dioxide bath is gradually raised by adding more acetone, the latter being at about 75° F. The same end-point in the standard Wiley procedure, i.e., the temperature at which the disc at the interphase becomes an elastic sphere, is recorded as the melting point.

The frying oil to be used in the present invention is also characterized by having a linoleic acid content which is about 50 to 90% of the concentration in the original unhydrogenated oil. The hydrogenated oil does not exhibit any significant increase in saturated fatty acid content. In the case of frying oils which have been prepared by selective hydrogenation of starting oils, e.g. cottonseed oil, having a linoleic acid content of not more than about 52%, the linoleic acid content varies from about 15 to 25% and the saturated fatty acid content is not substantially greater than that of the original unhydrogenated oil. The frying oils, prepared from unhydrogenated oils containing a polyunsaturated fatty acid content above 52%, e.g. soya bean oil, have a saturated fatty acid content which is essentially the same as the starting oil, a linoleic acid content of 5 to 15% and a linolenic acid content of not more than 1%, these values having been obtained by the spectrophotometric procedure following alkali isomerization.

The present invention is particularly applicable to the us of frying oils which have been obtained by selectively hydrogenating vegetable oils having a high linoleic acid content, viz. a content in excess of 30%. The unhydrogenated oils coming within this category are, for example, corn, cottonseed, soybean, poppy seed, sesame, sunflower, rice-bran, etc. The examples given in Table I below illustrate several frying oils which can be used for the purpose of this invention.

TABLE I

*Novel frying oils of the present invention in reference to frying oils used by the prior art*

| Example | Class [1] | Iodine Value | M.P., °F. | S.P., °F. | Fatty Acid Content, percent | | | | A.O.M. Stability,[2] hours |
|---|---|---|---|---|---|---|---|---|---|
| | | | | | Linolenic | Linoleic | Oleic | Saturated | |
| Ref.: | | | | | | | | | |
| A | Limpid unhydrogenated CSO | 109.0 | 57.0 | 30.2 | 0.0 | 49.6 | 21.3 | 24.7 | 12 |
| B | Frying CSO shortening | 60.6 | 103.3 | 84.4 | 0.0 | 2.1 | 63.1 | 30.4 | 90 |
| C | do | 59.4 | 109.0 | 86.9 | 0.0 | 6.8 | 52.5 | 36.3 | 60 |
| 1 | Novel frying CSO | 84.9 | 90.7 | 59.5 | 0.0 | 18.6 | 57.0 | 20.0 | 30 |
| 2 | do | 81.2 | 92.0 | 63.0 | 0.0 | 15.8 | 58.5 | 21.3 | 38 |
| 3 | do | 91.0 | 88.3 | 56.3 | 0.0 | 25.2 | 50.8 | 19.6 | 26 |
| 4 | do | 85.4 | 91.8 | 63.0 | 0.0 | 18.9 | 57.0 | 19.7 | 34 |
| Ref.: | | | | | | | | | |
| D | Limpid unhydrogenated SBO | 132.2 | 24.0 | 11.3 | 6.8 | 52.6 | 23.8 | 12.4 | 8 |
| E | Frying SBO shortening | 67.2 | 106.9 | 89.4 | 0.0 | 0.0 | 74.8 | 20.8 | 210 |
| F | do | 69.5 | 114.3 | 84.6 | 0.0 | 4.3 | 68.6 | 22.7 | 120 |
| 5 | Novel frying SBO | 88.5 | 85.5 | 58.5 | 0.5 | 10.4 | 76.0 | 8.7 | 60 |
| 6 | do | 86.0 | 91.0 | 59.2 | 0.2 | 8.9 | 77.1 | 9.4 | 75 |
| 7 | do | 89.8 | 83.5 | 56.7 | 0.5 | 12.1 | 74.0 | 9.0 | 57 |
| 8 | do | 83.3 | 83.3 | 59.5 | 0.1 | 6.4 | 79.5 | 9.6 | 92 |
| Ref. G | Limpid unhydrogenated CO | 122.3 | 27.0 | 12.2 | 0.0 | 51.4 | 32.6 | 11.6 | 10 |
| 9 | Novel Frying CO | 87.2 | 87.8 | 59.1 | 0.0 | 12.1 | 72.7 | 10.8 | 51 |
| Ref. H | Limpid unhydrogenated PNO | 93.4 | 59.0 | 37.8 | 0.0 | 23.1 | 53.5 | 17.0 | 24 |
| 10 | Novel frying PNO | 76.4 | 86.6 | 58.0 | 0.0 | 7.8 | 69.4 | 18.4 | 56 |

[1] CSO=cottonseed oil; SBO=soybean oil; CO=corn oil; PNO=peanut oil.
[2] Active Oxygen Method of King et al., Oil and Soap, vol. 10 p. 105 (1933), modified by Riemenschneider et al., Oil and Soap, vol. 20, p. 169 (1943). These values reflect the resistance of the oils to oxidative deterioration.

Selective hydrogenation is a technique well known to those skilled in the art and is characterized by preferential hydrogenation of the fatty acids containing active methylene groups (linoleic) in preference to acids devoid of such groups (oleic). Generally, a temperature of 250° F. is recognized as the dividing point between selective and non-selective hydrogenation conditions. Below 250° F. hydrogenation tends to be non-selective in character, whereas at temperatures above 250° F., hydrogenation tends to be selective. The degree of selectivity is enhanced as the temperature increases above 250° F. For the purpose of this invention the hydrogenation temperature is in excess of 250° F. and preferably about 300 to 350° F.

To illustrate the nature of the selective hydrogenation process, reference will be had to the methods of preparing Examples 1–10 in Table I above. The starting materials are identified by letter as the Reference oils in Table I.

Examples 1 and 4 of Table I were prepared from starting oil Ref. A. Examples 5–8 of Table I were prepared from starting oil Ref. D, whereas Examples 9 and 10 were prepared from starting oils Ref. G and H, respectively. For the preparation of the selectively hydrogenated frying oil, 20,000 pounds of starting oil were pumped into a hydrogenation vessel. A nickel catalyst known as Rufert's catalyst (described in U.S. Patent No. 2,424,811) in an amount of about 0.1% (based upon nickel content of the catalyst) was added to the oil charge. The temperature of the oil in catalyst mixture was raised to about 270°–300° F. The reaction mixture was subjected to hydrogen gas pressure of about 20 p.s.i. As soon as the hydrogen pressure was imposed on the reaction mixture the temperature was increased to 300°–350° F. The hydrogenation reaction was permitted to proceed, with agitation, until the product attained the characteristics described in Table I above. The hydrogenated oil products were filtered for the removal of the catalyst and then deodorized by the high vacuum-steam treatment described by Bailey in U.S. Patent No. 2,691,665. The methods of determining the fatty acid contents of the oils are the same as those described in our Patent No. 2,874,055, issued February 17, 1959, and are hereby incorporated by reference.

The frying oils of the present invention contain about 0.8 to 6% conjugated dienoic acids. The unhydrogenated limpid oils contain essentially no conjugated dienoic acids, whereas shortenings usually contain from 0 to 0.6% of such acids. Conjugation of the double bonds in the polyunsaturated fatty acids is known to be the first stage (precursor) in the formation of thermal polymers in vegetable oils. See Privett et al., J. Am. Oil Chem. Soc., vol. 24, p. 204 (1947). The polymers are not removed by steam distillation at atmospheric pressure and so they are not distillable from frying oils throughout the frying of foods. The mechanism of polymer formation has been described by Cowan, J. Am. Oil Chem. Soc., vol. 31, p. 525 (1954). The conjugated dienoic acid reacts with the natural linoleic acid present to form a dimer. As a result of this reaction the number of double bonds reduces from 4 to 2. The dimer can further react with another dienoic acid to form a trimer. By this reaction mechanism the iodine value of the oil decreases with polymer formation. The presence of conjugated dienoic acids per se is not detrimental to health, but are actually readily metabolizable nutrients. On the other hand, as previously mentioned, the polymers formed from the conjugated dienoic acids are not readily absorbed from the digestive tract and some polymers may actually be toxic. At first glance the frying oils used for the purpose of the present invention seem to be unsuitable by reason of the high initial concentration of conjugated dienoic acids.

A series of experiments was performed for the purpose of determining whether the frying oils of the present invention were resistant to polymer formation when heated at elevated temperatures, approximating those employed for fryings. The test is one widely used for rating oils as regards their susceptibility to polymer formation. See Crampton et al., J. Nutrition, vol. 43, pp. 431 and 533 (1951); vol. 44, p. 177 (1951); vol. 49, p. 333 (1953); vol. 60, p. 13 (1956); also Kaunitz et al., J. Nutrition, vol. 55, p. 557 (1955); vol. 60, p. 237 (1956); J. Am. Oil Chem. Soc., vol. 33, p. 630 (1956); and also Kummerow et al., J. Am. Oil Chem. Soc., vol. 33, p. 433 (1956) and vol. 34, p. 407 (1957). It is known that the tendency towards polymer formation is related directly to the temperature of frying and the degree of polyunsaturation of the oil. Table II below presents illustrative data showing the effect of heating (1) limpid unhydrogenated cottonseed oil, (2) the frying oil of the present invention and (3) a shortening.

TABLE II

*Apparent poor stability of the novel frying oil of this invention relative to other frying oils when these are heated in an iron vessel at the frying temperature of about 385° F. but without potato slices present*

| Class | State of Oil | Iodine Value | Conjugated Dienoic Acid, percent | Linoleic Acid, percent | Total Dienoic Acids, percent | A.O.M. Stability, hours |
|---|---|---|---|---|---|---|
| Unhydrogenated CSO | Fresh | 116.4 | 0.00 | 55.0 | 55.0 | 12 |
|  | Heated, 4½ hrs. | 100.1 | 4.31 | 34.7 | 39.0 | 1 |
|  | Change | −16.3 | +4.31 | −20.3 | −16.0 | −11 |
| Novel Frying Oil | Fresh | 90.3 | 2.72 | 20.2 | 22.9 | 25 |
|  | Heated, 4½ hrs. | 70.7 | 0.00 | 8.9 | 8.9 | 3 |
|  | Change | −19.6 | −2.72 | −11.3 | −14.0 | −22 |
| Shortening | Fresh | 71.4 | 0.00 | 5.9 | 5.9 | 125 |
|  | Heated, 4½ hrs. | 65.0 | 0.00 | 2.7 | 2.7 | 62 |
|  | Change | −6.4 | 0.00 | −3.2 | −3.2 | −63 |

In the experiments summarized in Table II, 250 grams of the test oil were placed in an iron vessel. The oil occupied the vessel to a depth of ¾ of an inch. The vessel containing the oil was placed on an electric hot plate with an asbestos pad between it and the vessel. A thermometer was suspended in the middle of the oil. The oil was heated while exposed to the atmosphere to a temperature of 385° F. and maintained at that level for a period of 4½ hours. The oil was heated in a quiescent state.

It can be seen from Table II that in spite of the significantly lower concentration of linoleic acid content and total dienoic acid content of our frying oil in comparison with those of the unhydrogenated cottonseed oil, the oil of the present invention still exhibited a large decrease in iodine value. The unhydrogenated oil showed an increase in concentration of conjugated dienoic acid as might be expected. On the other hand, the frying oil to be used for the present invention exhibited a complete loss of conjugated dienoic acid, indicating that it quickly reacted with the natural linoleic acid present to form polymers. Another significant change as regards the oil to be used for the present invention is the large loss in A.O.M. stability as a result of heating, with residual stability being no better than that of the heated unhydrogenated oil.

Thus, according to the prior art teachings on the significance of conjugated dienoic acids in oils and according to the results of the heat-abuse tests of the prior art, there was every reason to reject the novel oils of our invention as a frying medium for foods. Nevertheless, we investigated the value of our novel oil in frying foods under commercial operating conditions. The major study (see Table III) was concerned with the possiblity of thermal polymers being formed in excessively high concentrations when our novel oil, the same as employed in the study summarized in Table II, was employed in the commercial production of potato chips using the continuous process described heretofore.

TABLE III

*Excellent stability of the novel frying oil[1] of this invention when heated in an iron vessel at the frying temperature of about 385° F. but with potato slices present*

| State of Oil | Iodine Value | Conjugated Dienoic Acid, percent | Linoleic Acid, percent | Total Dienoic Acids, percent | A.O.M. Stability, hours |
|---|---|---|---|---|---|
| Fresh | 90.3 | 2.72 | 20.2 | 22.9 | 25 |
| Heated, 40 hrs | 89.3 | 2.70 | 20.0 | 22.7 | 23 |
| Change | −1.0 | −0.02 | −0.2 | −0.2 | −2 |

[1] Same novel frying oil employed in the studies summarized in Table II.

The data shown in Table III emphasize the unexpected excellent stability of the novel frying oil of our invention when heated in an iron vessel at the frying temperature of about 385° F. but with potato slices present. The period of frying was 40 hours in the commercial frying operation in contrast to the short period of 4½ hours in the laboratory study discussed above (see Table II).

From the findings reported in Table III it is apparent that the oil of the present invention undergoes very little change in character when used in the manufacture of potato chips. It will be noted that there occurred no decrease in the concentration of conjugated dienoic acid showing that the polymer precursor did not enter into polymer formation reactions in the presence of the food being fried. The decrease in iodine value and in total dienoic acid content were of an insignificant degree. The results of the A.O.M. stability test indicated that the food being fried protected the frying oil against loss of stability, the A.O.M. stability value of the heated oil being practically the same as that of the fresh oil.

In an effort to understand better the nature of the present invention, an experiment was performed in which air was excluded by maintaining a stream of carbon dioxide over the oil of the present invention as it was being heated in a covered iron container in the absence of potato slices. The oil was heated for a period of 10½ hours at 385° F., about one-fourth of the frying period employed in the manufacture of the potato chips. At the end of this period the iodine value dropped 8.6, the conjugated dienoic acid content was zero, showing that it was used in the formation of polymers, the linoleic acid content decreased by 4.5%, the total dienoic acid content decreased by 7.5% and the A.O.M. stability value decreased to 3 hours. It is apparent that a protective atmosphere alone is not adequate in preventing thermal polymers forming in our novel frying oil, but that potato slices per se must be in contact with the oil during the frying or heating operation.

As compared to frying operations involving foods other than potato chips, it is noted that the process of the present invention is unexpectedly superior over such processes. Furthermore, based on the experiments in which the oil of the present invention was heated in the absence of potato slices, it is evident that a continuous operation must be employed in order to derive the advantages of the present invention. Intermittent fryings with the oil held throughout the day at frying temperatures, but without being used for frying of potato slices, result in polymers forming in our novel oil.

From our observations it is not clear why the unexpected favorable results are achieved when our novel oils are used in the continuous frying of potato slices. At first it was theorized that the moisture content of the potato created a protective steam atmosphere above the frying oil and thus prevented degradative reactions from occurring. This theory was set aside as a result of the experiment in which carbon dioxide alone was employed as a protective atmosphere during the heating of the oil of the present invention. As shown hereinabove, heating caused the novel oil to undergo severe degradation under a carbon dioxide atmosphere but without the potato slices in the oil. By way of explanation and not as a limitation on the scope of the invention, it appears that potatoes contain ingredients or produce substances during the frying operation which serve to protect the heated oil from adverse reactions. The nature of these compounds is not known and it can only be surmised that their concentrations are sufficient to effect protection of our novel frying oil in continuous fryings.

By reason of the unique cooperation between the frying oil of the present invention and potato slices, the resultant potato chip product has a combination of superior appearance and eating qualities and of stabiltiy over potato chip products which were prepared by (*a*) the use of a limpid unhydrogenated oil, (*b*) a shortening, (*c*) a blend of limpid oil and shortening, and (*d*) an intermittent operation employing the frying oil of the present invention. It is customary in the potato chip business, especially during the summer months, to return all potato chip products fried in limpid unhydrogenated oils which have not been sold at the end of a four-week period. The four-wek period is considered as a maximum for flavor acceptability of such products. With this criterion in mind, a comparison is given in Table IV below among potato chip products prepared by various frying methods. The chips in sealed clear cellophane bags were held at room temperature (about 75° F.) and exposed to indirect northern light.

TABLE IV

*Superiority of chips prepared by the process of the present invention over those prepared by processes of the prior art*

| Frying Oil | Appearance and eating qualities of potato chips at the end of four weeks |
|---|---|
| Frying oil of the present invention, Example 1 of Table I. | Liquid oil film on surface, good salt adherence, full flavor release, good mouthing properties and fairly good to good in flavor. |
| Limpid unhydrogenated oil, Reference A of Table I. | Liquid oil film on surface, good salt adherence, good mouthing properties, rapid flavor release but fair to poor in score because of rancidity. |
| Shortening, Example B of Table I. | Dry in appearance, poor salt adherence, dry mouthing properties, flavor muffed although that which comes through was fairly good to good. |
| 50:50 blend of limpid oil (Reference A of Table II) and shortening (Reference B of Table II). | Dry in appearance, poor salt adherence, dry mouthing properties, flavor muffed, and fair in flavor due to starting rancidity. |

From the data given in Table IV, it will be noted that the potato chip prepared by continuously frying raw potato slices with the frying oil of the present invention resulted in a product having exceptionally good flavor at the end of four weeks as compared to that of the chips fried in the limpid unhydrogenated oil. As regards the potato chips prepared by frying in shortening alone, the resultant product is almost as acceptable as the fresh product in flavor quality at the end of four weeks but the appearance and eating qualities are vastly inferior to the potato chip of the present invention. The potato chips fried in the blend of limpid oil and shortening had neither the appearance and eating qutlity nor the flavor quality of the chips fried in our novel oil and also held under the same conditions prior to scoring. These data establish

We claim:
1. A process which comprises frying potato slices continuously in a deodorized hydrogenated vegetable seed oil having an iodine value of from 75 to 94, a melting point of from 80° to 95° F., and a setting point of from 55° to 65° F.

2. A process which comprises frying potato slices continuously in a deodorized hydrogenated vegetable seed oil having an iodine value of from 82 to 94, a melting point of from 82° to 92° F., and a setting point of from 55° to 65° F., and having a polyunsaturated acid content which has been reduced from 50% to 90% of that of the original unhydrogenated oil from which it is produced but having no greater saturated fatty acid content than the original oil.

3. A process which comprises frying potato slices continuously in a deodorized hydrogenated vegetable seed oil having an iodine value of from 75 to 92, a melting point of from 85° to 95° F., and a setting point of from 55° to 65° F., and having a polyunsaturated acid content which has been reduced from 50% to 90% of that of the original unhydrogenated oil from which it is produced but having no greater saturated fatty acid content than the original oil.

4. A process which comprises frying potato slices continuously in a deodorized hydrogenated cottonseed oil having an iodine value of from 80 to 92, a melting point of from 85° to 95° F., a setting point of from 55° to 65° F., a linoleic acid content of from 15% to 25%, and a saturated fatty acid content of not more than about 25%.

5. A process which comprises frying potato slices continuously in a deodorized hydrogenated soybean oil having an iodine value of from 82 to 94, a melting point of from 82° to 92° F., a setting point of from 55° to 65° F., a linolenic acid content of not more than 1%, a linoleic acid content of from 5% to 15%, and a saturated fatty acid content of not more than about 13%.

6. The process of preventing polymer formation in frying oil which comprises maintaining potato slices in continuous contact with a liquid body of said oil during the time that said body of oil is at frying temperature, said frying oil consisting essentially of a deodorized hydrogenated vegetable seed oil having an iodine value of from 75 to 94, a melting point of from 80° to 95° F., and a setting point of from 55° to 65° F.

7. The process of preventing polymer formation in frying oil which comprises maintaining potato slices in continuous contact with a liquid body of said oil during the time that said body of oil is at a frying temperature of about 320° to 400° F., said frying oil consisting essentially of a deodorized hydrogenated vegetable seed oil having an iodine value of from 82 to 94, a melting point of from 82° to 92° F., and a setting point of from 55° to 65° F., and having a polyunsaturated acid content which has been reduced from 50% to 90% of that of the original unhydrogenated oil from which it is produced but having no greater saturated fatty acid content than the original oil.

8. The process of preventing polymer formation in frying oil which comprises maintaining potato slices in continuous contact with a liquid body of said oil during the time that said body of oil is at a frying temperature of about 320° to about 400° F., said frying oil consisting essentially of a deodorized hydrogenated vegetable seed oil having an iodine value of from 75 to 92, a melting point of from 85° to 95° F., and a setting point of from 55° to 65° F., and having a polyunsaturated acid content which has been reduced from 50% to 90% of that of the original unhydrogenated oil from which it is produced but having no greater saturated fatty acid content than the original oil.

9. The process of preventing polymer formation in frying oil which comprises maintaining potato slices in continuous contact with a liquid body of said oil during the time that said body of oil is at a frying temperature of about 320° to about 400° F., said frying oil consisting essentially of a deodorized hydrogenated cottonseed oil having an iodine value of from 80 to 92, a melting point of from 85° to 95° F., a setting point of from 55° to 65° F., a linoleic acid content of from 15 to 25%, and a saturated fatty acid content of not more than about 25%.

10. The process of preventing polymer formation in frying oil which comprises maintaining potato slices in continuous contact with a liquid body of said oil during the time that said body of oil is at a frying temperature of about 320° to about 400° F., said frying oil consisting essentially of a deodorized hydrogenated soybean oil having an iodine value of from 82 to 94, a melting point of from 82° to 92° F., a setting point of from 55° to 65° F., a linolenic acid content of not more than 1%, a linoleic acid content of from 5 to 15%, and a saturated fatty acid content of not more than about 13%.

References Cited in the file of this patent

UNITED STATES PATENTS

| | | |
|---|---|---|
| 2,611,705 | Hendel | Sept. 23, 1952 |
| 2,836,496 | Salvo | May 27, 1958 |
| 2,855,308 | Buechele et al. | Oct. 7, 1958 |
| 2,874,055 | Melnick | Feb. 17, 1959 |